United States Patent
Aihara et al.

(10) Patent No.: US 9,695,799 B2
(45) Date of Patent: Jul. 4, 2017

(54) BLADE BODY, WIND TURBINE AND WIND POWER

(71) Applicant: Global Technology Institute. Co., Ltd., Tokyo (JP)

(72) Inventors: Kunihiko Aihara, Tokyo (JP); Junko Aihara, Tokyo (JP)

(73) Assignee: GLOBAL TECHNOLOGY INSTITUTE. CO., LTD., Tokyo (JP)

( * ) Notice: Subject to any disclaimer, the term of this patent is extended or adjusted under 35 U.S.C. 154(b) by 875 days.

(21) Appl. No.: 13/953,425

(22) Filed: Jul. 29, 2013

(65) Prior Publication Data

US 2014/0037454 A1 Feb. 6, 2014

Related U.S. Application Data

(60) Provisional application No. 61/677,631, filed on Jul. 31, 2012.

(51) Int. Cl.
  *F03B 3/12* (2006.01)
  *F03D 1/06* (2006.01)
  *F03D 3/06* (2006.01)

(52) U.S. Cl.
  CPC ........... *F03D 1/0633* (2013.01); *F03D 3/061* (2013.01); *Y02E 10/721* (2013.01); *Y02E 10/74* (2013.01)

(58) Field of Classification Search
  CPC ........ F03D 1/0633; F03D 3/065; F03D 3/062; F03D 3/061
  USPC ..................................................... 416/236 R
  See application file for complete search history.

(56) References Cited

U.S. PATENT DOCUMENTS

| | | | | |
|---|---|---|---|---|
| 4,434,957 A * | 3/1984 | Moritz | ................... | B64C 21/10 244/130 |
| 5,133,516 A * | 7/1992 | Marentic | ................. | B05D 5/02 244/130 |
| 8,550,786 B2 * | 10/2013 | Janiuk | ..................... | F03D 3/061 415/4.2 |
| 8,894,373 B2 * | 11/2014 | Firic | ...................... | F03D 3/061 416/223 R |
| 2007/0224029 A1 * | 9/2007 | Yokoi | ..................... | F03D 3/005 415/4.2 |
| 2009/0167030 A1 * | 7/2009 | Watkins | .................. | F03D 3/061 290/55 |

(Continued)

FOREIGN PATENT DOCUMENTS

JP 2006-046306 A 2/2006

*Primary Examiner* — Gregory Anderson
*Assistant Examiner* — Jason Fountain
(74) *Attorney, Agent, or Firm* — Enshan Hong; VLP Law Group LLP

(57) ABSTRACT

A blade comprises a first blade surface, a second blade surface forming the reverse surface of the first blade surface, a primary wind receptor protruding from the front end of the first blade surface in a direction away from the second blade surface and with the back surface formed in a curved shape concave toward the front side in a forward direction, a front edge connected to the front end of the primary wind receptor and the front end of the second blade surface and formed in a curved shape convex toward the forward direction, and a back edge connected to the back end of the first blade surface and the back end of the second blade surface and formed in an acute angle facing the back side of the forward direction.

5 Claims, 23 Drawing Sheets

(56) References Cited

U.S. PATENT DOCUMENTS

2011/0194938 A1* 8/2011 Livingston ............... B63H 9/00
                                                  416/132 B
2012/0242087 A1* 9/2012 Ruder .................... F03D 3/061
                                                    290/55

* cited by examiner

A-A

BLADE BODY, WIND TURBINE AND WIND POWER

CROSS-REFERENCE TO RELATED APPLICATION

This application claims the benefit of U.S. Provisional Application No. 61/677,631, filed on Jul. 31, 2012, the entire disclosure of which is incorporated by reference herein.

FIELD

The present invention relates to a blade, wind turbine and wind power generating system.

BACKGROUND

Wind turbines used to generate wind power include horizontal axis wind turbines in which the axis of rotation is positioned parallel to the earth's surface and vertical axis wind turbines in which the axis of rotation is positioned perpendicular to the earth's surface. In addition, vertical axis wind turbines are classified roughly as either a lift type, in which the wind turbine is caused to rotate by a lift force acting on the blades, or as a drag type, in which the wind turbine is caused to rotate by a drag acting on the blades. As a conventional drag type of wind turbine, the type disclosed in Unexamined Japanese Patent Application Kokai Publication No. 2006-46306 has been known from before.

With a conventional drag type wind turbine, because the rotational velocity is determined so as to be proportional to wind speed, especially during very high winds such as typhoon-class winds, there are concerns that the rotational velocity could become excessively great, causing equipment damage and deformation. In addition, when the number of rotations of the wind turbine during all wind speeds is controlled in order to avoid this kind of situation, the problem arises that efficiency is lost in a medium wind speed range and startability is lost in a low wind speed range.

In consideration of the foregoing, it is an object of the present invention to provide a blade, a wind turbine and a wind power generating device that can achieve good startability during low wind speeds (i.e. a range of wind speeds classified as low) and high energy conversion efficiency during medium winds (i.e. a range of wind speeds classified as medium), while also preventing velocity from becoming excessively great during high winds (i.e. a range of wind speeds classified as high).

SUMMARY

In the following, according to a principle of the present invention, a summary of the present invention for accomplishing the object above is given.

The blade according to a first aspect of the present invention is a blade that receives drag from wind and advances in a forward direction, this blade comprising: a first blade surface; a second blade surface forming a back surface of the first blade surface; a step protruding from the front end of the first blade surface in a direction going away from the second blade surface, and with the back surface formed in the shape of a curved surface concave toward the front side of the forward direction; a front edge connected to the front end of the step and the front end of the second blade surface and formed in a curved surface shape convex toward the forward direction; and a back edge connected to the back end of the first blade surface and the back end of the second blade surface and forming an acute angle facing the back side of the forward direction.

Multiple peaks protruding in the direction away from the second blade surface may be formed on the first blade surface.

The first blade surface may be formed as a flat surface.

The curved surface concave toward the second blade surface may be formed in the step.

The back edge may be bent toward the second blade surface side.

A blade according to a second aspect of the present invention is a blade that receives drag from wind and advances in a forward direction, this blade comprising: a first blade surface; a second blade surface forming a back surface of the first blade surface; a step protruding from the front end of the first blade surface in a direction going away from the second blade surface, and with the back surface formed in an inclined surface going away from the second blade surface as the back edge surface moves in the forward direction; a front edge connected to the front end of the inclined surface and the front end of the second blade surface and formed in a curved surface shape convex toward the forward direction; and a back edge connected to the back end of the first blade surface and the back end of the second blade surface and forming an acute angle facing the back side of the forward direction.

A wind turbine may have the blade provided so that the first blade surface faces the outside.

A wind power generating device may be provided with the wind turbine.

With the present invention, it is possible to achieve good startability in the low wind speed range and high energy conversion efficiency in the medium wind speed range while preventing speeds from becoming excessively large in the high wind speed range.

BRIEF DESCRIPTION OF THE DRAWINGS

A more complete understanding of this application can be obtained when the following detailed description is considered in conjunction with the following drawings, in which.

DETAILED DESCRIPTION

First Embodiment

Figure 1:
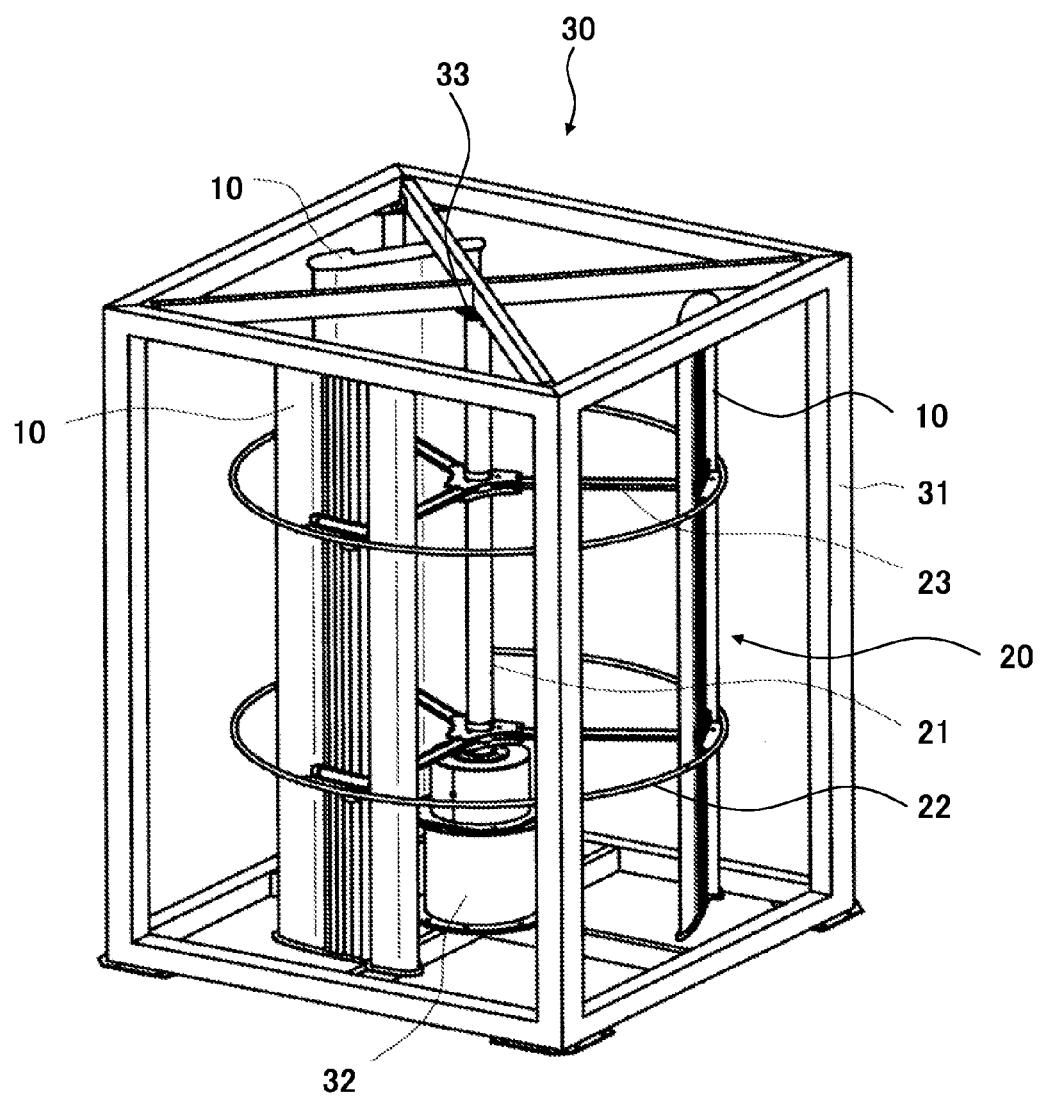
FIG. 1 is an oblique view of a wind power generating device according to a first preferred embodiment of the present invention.
Figure 2:
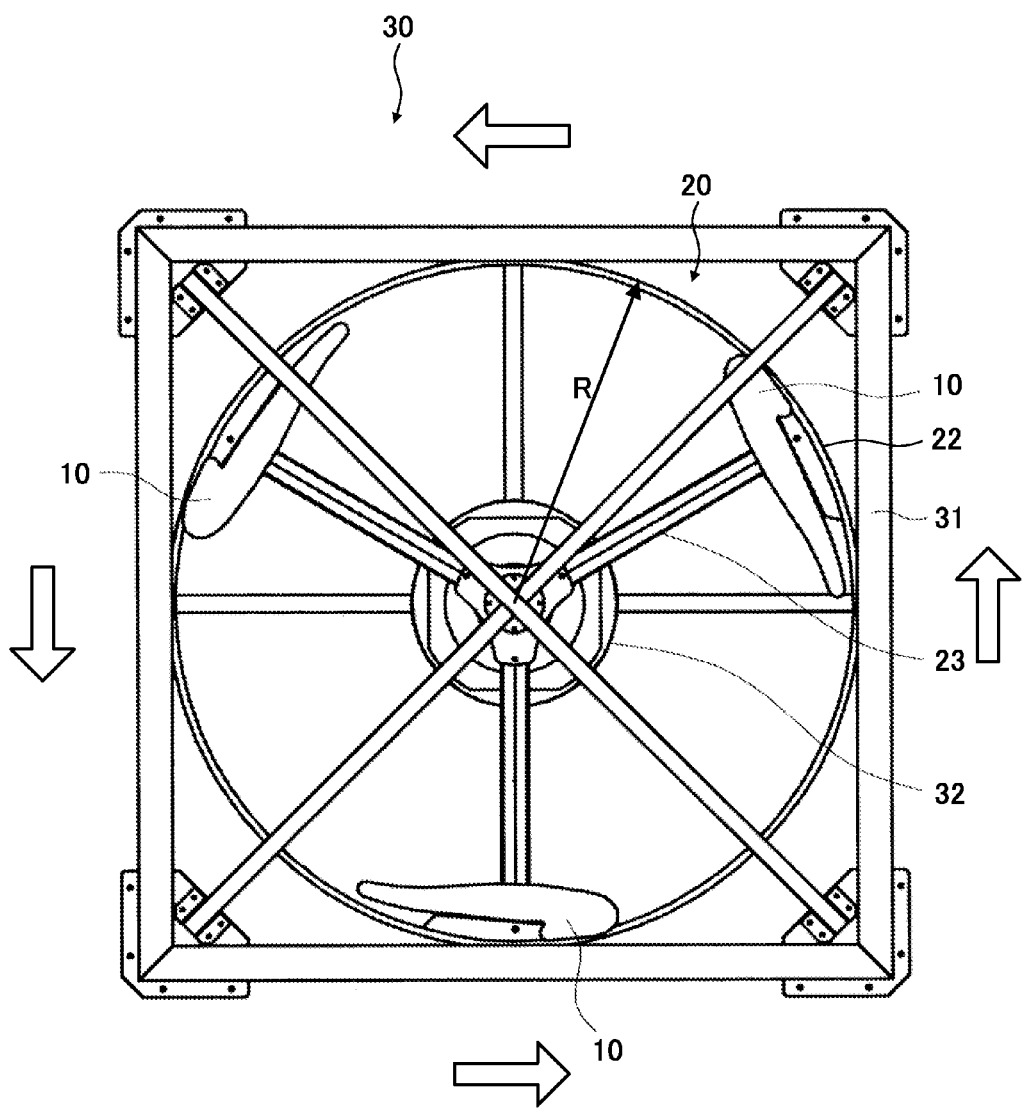
FIG. 2 is a planar view of a wind power generating device according to a first preferred embodiment of the present invention.

FIG. 1 is a complete oblique view of the wind power generating device 30, and FIG. 2 is a planar view of the wind power generating device 30 as seen from above. The wind power generating device 30 uses the rotational force of a wind turbine 20 that rotates under wind energy to generate electricity, and is provided with the wind turbine 20, a frame 31, a generator 32 and a rotational gear 33.

The wind turbine 20 is a so-called vertical axis wind turbine, and is positioned in the frame 31 of the wind power generating device 30 so that a rotating shaft 21 is vertical with respect to the bottom surface and top surface of the frame 31.

The wind turbine 20 is provided with the rotating shaft 21, two rings 22, spokes 23 and three blades 10. The rings 22 are connected to the rotating shaft 21 via three spokes 23, which are slender round bars extending radially from the rotating shaft 21. The spokes 23 are formed in the blades 10 and pass through holes (unrepresented) penetrating the blades 10 in the direction of thickness. Each blade 10 is fixed to the inner surface of the rings 22 in a state in which a below-described first blade surface 11 (see FIG. 4) faces the outside. The radius R of the wind turbine 20 is, for example, 980 mm.

As shown in FIG. 2, when the wind turbine 20 is viewed from the top side of the rotating shaft 21, the three blades 10 are each arranged such that a below-described front edge 13 (see FIG. 4) faces in the counterclockwise direction, centered about the axis of the rotating shaft 21. The wind turbine 20 is configured so as to rotate in the counterclockwise direction as indicated by the white arrows in FIG. 2, and this is described in more detail below.

The frame 31 is composed of steel materials such as square pipes or angle iron, and is a frame formed into a right-angled parallelepiped. The height of the frame 31 is, for example, 2,800 mm, and the width and depth of the frame 31 are, for example, 2,300 mm.

On the bottom of the frame 31, square pipes are arranged so as to intersect in a cross shape, and the generator 32 is fixed on top of that intersection. On the top of the frame 31, square pipes are arranged intersecting in an x-shape so as to connect opposite corners of the top surface, and the bearing 33 is mounted on the underside surface of this intersection. The bearing 33 supports the top end of the rotating shaft 21 of the wind turbine 20, allowing such to freely rotate. A leg plate is welded to the four corners of the bottom surface of the frame 31. A hole formed on the leg plate is used to fix the frame 31 to the ground or structure, and an anchor bolt is driven into the hole.

The generator 32 is composed of a stator (unrepresented) and a rotor (unrepresented) having magnetic poles supported so as to be free to rotate with respect to the stator. The stator is fixed to the bottom surface of the frame 31, while the rotor is connected to the bottom edge of the rotating shaft 21 of the wind turbine 21.

Figure 3:
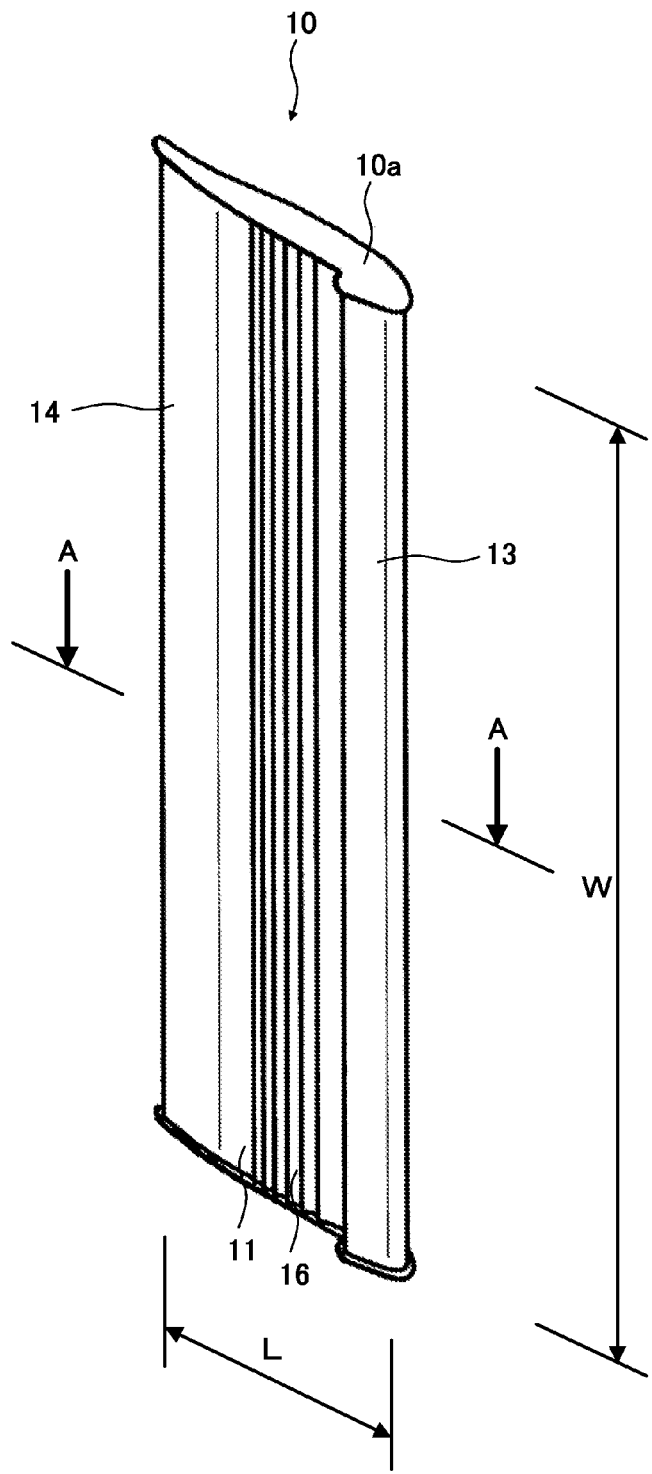
FIG. 3 is an oblique view of a blade according to a first preferred embodiment of the present invention.

Next, the composition of the blades 10 will be explained with reference to FIGS. 3 and 4.

Each blade 10 has a rectangular blade plane surface and is provided with a blade end plate 10a, a first blade surface 11, a second blade surface 12, a front edge 13, a back edge 14 and primary wind receptor 15 and a secondary wind receptor 16. The blade length W (the length in the direction of depth in FIG. 4) of the blade 10 is, for example, 2,500 mm, the front-back direction length L (the length in the left-right direction in FIG. 4) of the blade 10 shown in FIG. 3 is, for example, 723 mm, and the thickness T (see FIG. 4) of the blade 10 is, for example, 120 mm. The blade 10 is made of aluminum, for example, is hollow inside and is provided with reinforcing materials (unrepresented) inside. The weight of the blade 10 is 14 kg, for example.

The blade end plates 10a are flat plates and are provided so as to cover both end surfaces of the blade 10. The outline shape of each blade end plate 10a is formed in an outline shape with the cross-sectional shape of the blade 10 expanding toward the outside.

The front edge 13 has a streamlined shape as a result of having a curved surface convex toward the outside of the blade 10, with the curvature of the front end being widest. In addition, the length M of the front edge 13 in the front-back direction is roughly twice the thickness T of the front edge 13 and roughly one-fourth the length L of the blade 10 in the front-back direction.

The back edge 14 has a sharp V shape, and curves toward the second blade surface 12 with a constant curvature so that the first blade surface 11 side becomes convex.

Between the front edge 13 and the first blade surface 11, a step is provided, having a curved surface curving in a parabolic shape facing the back edge 14 side and curving toward the front edge 13 side. The curved surface of the step functions as the primary wind receptor 15 for receiving drag from the wind. This primary wind receptor 15 is provided along the entire lengthwise direction of the blade 10, that is to say, from one blade end to the other blade end. The length of the primary wind receptor 15 (the length in the top-bottom direction in FIG. 4) is somewhat smaller than the distance between the first blade surface 11 and the second blade surface 12.

The first blade surface 11 extends along a blade chord CL (the line connecting the front end of the front edge 13 and the back end of the back edge 14), and six sawtooth-shaped ridges 16a with peaks extending in the front-back direction of the blade 10 are formed on the first blade surface 11. The six ridges 16a face the back edge 14 side, and the ridges' 16a height and length in the front-back direction becomes smaller toward the back edge 14 side. The six ridges 16a function as a secondary wind receptor 16 for receiving drag from the wind.

Figure 4:
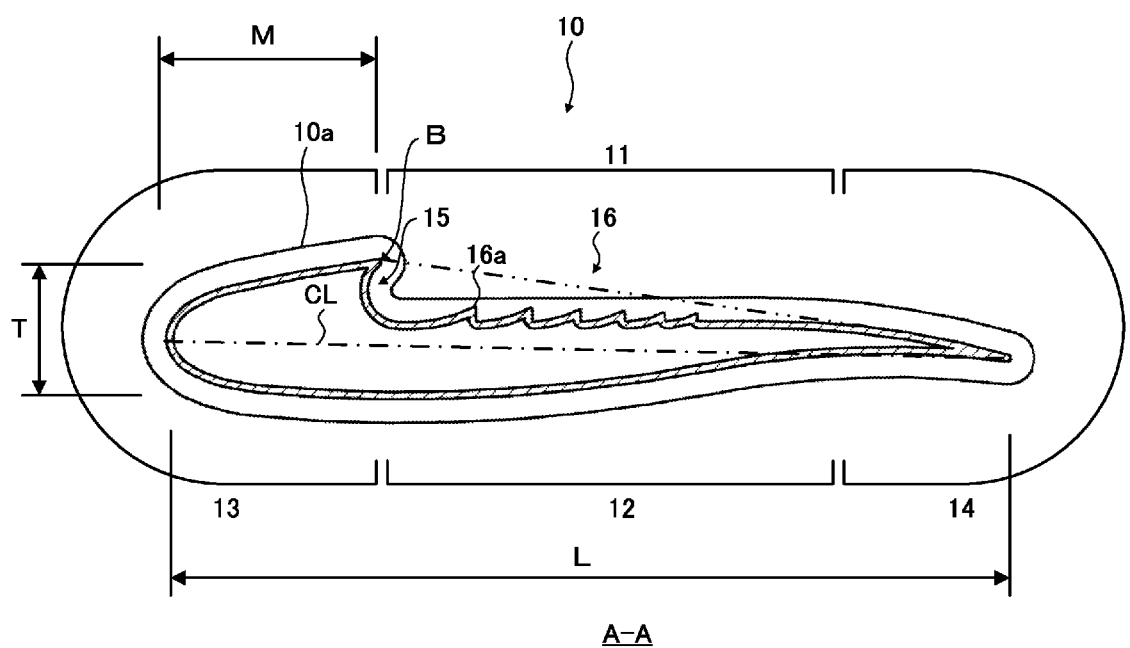
FIG. 4 is a cross-sectional view of the blade taken in the A-A direction shown in FIG. 3.

The six ridges 16a are formed so as to be lower than the straight line touching the back edge 14 and passing through the connection B between the front edge 13 and the primary wind receptor 15 (the double-dashed line in FIG. 4). Through this, the secondary wind receptor 16 receives only the wind blowing from the back edge 14 side, and does not receive wind blowing from the front edge 13 side.

The sum of the wind-receiving area of the primary wind receptor 15 and the wind-receiving area of the secondary wind receptor 16 is, for example, 4.9 m$^2$.

The second blade surface 12 extends along the blade chord CL and is composed of a convex curved surface facing the outside of the blade 10.

Next, the flow of wind surrounding the blade 10 and the lift acting on the blade 10 are explained. In the explanation below, the direction facing the back edge 14 from the front edge 13 is called the "regular flow direction" and the direction facing the front edge 13 from the back edge 14 is called the "reverse flow direction." As described above, the wind turbine power generating device 30 according to this preferred embodiment is equipped with three blades 10, but in order to simplify the explanation, the wind flow surrounding one blade 10 and the lift acting on that blade 10 will be explained.

Figure 5:
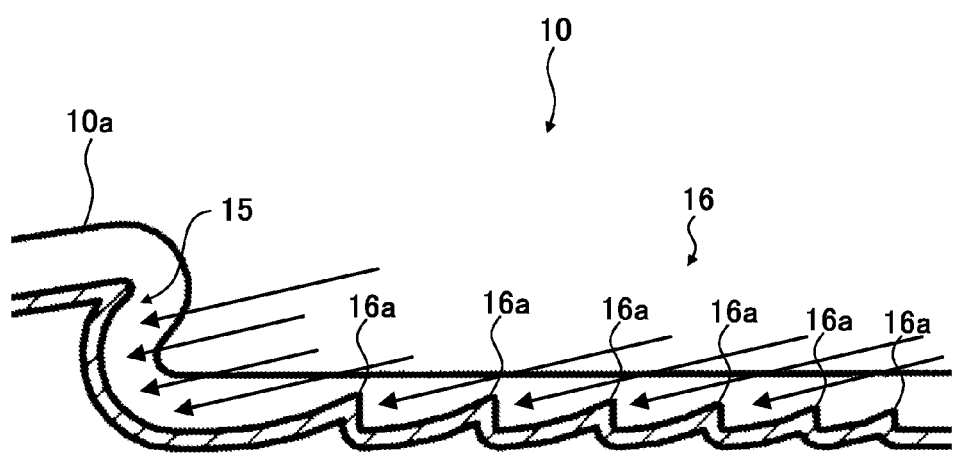
FIG. 5 is an enlarged diagram of a primary wind receptor and a secondary wind receptor of the blade.

FIG. 5 shows an enlargement of the primary wind receptor 15 and the secondary wind receptor 16 of the blade positioned so as to be along the wind flow direction. As shown in FIG. 5, when the wind blows in the reverse flow direction (indicated by the solid lines in the figure), the wind strikes the primary wind receptor 15 and the secondary wind receptor 16 so that the blade 10 receives drag from the wind. When this drag in the reverse flow direction acts on the blade 10, the blade moves in the reverse flow direction while the front edge 13 slices through the wind. Wind that has been sliced through flows along the surface of the blade 10 in the regular flow direction.

Figure 6:
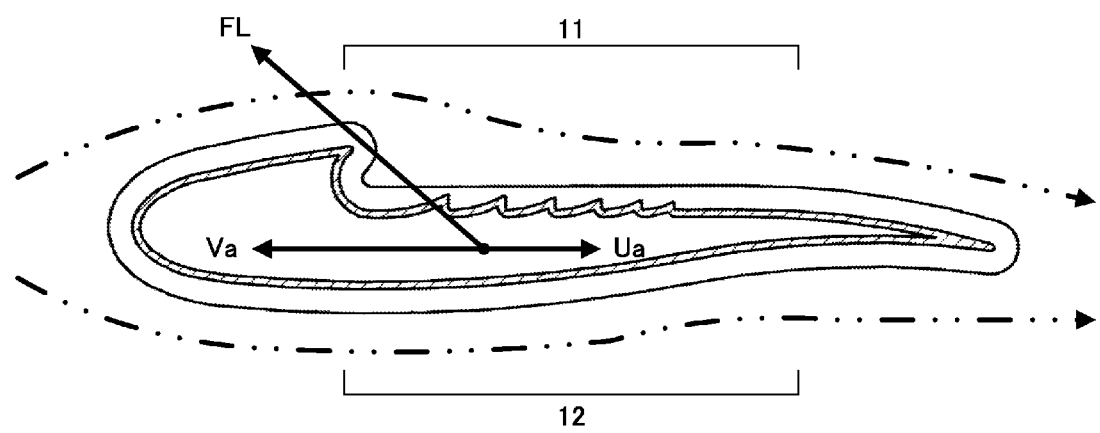
FIG. 6 is a drawing for explaining lift acting on the blade.

As shown in FIG. 6, the path of the wind flowing along the first blade surface 11 is somewhat longer than the path of the wind flowing along the second blade surface 12. Because of this path difference, a lift force FL acts on the blade 10 in the direction from the second blade surface toward the first blade surface 11 (the upward direction in FIG. 6). The horizontal component Va of this lift force FL acts in the reverse flow direction, and the magnitude thereof is greater than the air resistance Ua acting in the normal flow direction. Through this, a propulsion force (=Va−Ua) in accordance with the speed of the blade 10 is generated. Because the path difference is small, the magnitude of the lift force FL acting on the blade 10 is relatively small compared to the magnitude of the drag.

With a wind turbine generating device 30 having the above-described composition, when the wind strikes the primary wind receptor 15 and the secondary wind receptor 16, a drag acts on the blade 10 and the wind turbine 20 begins to rotate in the counterclockwise direction in FIG. 2 about the rotating shaft 21. When the rotational speed of the wind turbine 20 increases, lift proportional to the speed of the blade 10 acts. The wind turbine rotates, converting the counterforce acting on the blade 10 into rotational energy.

In addition, when the wind turbine 20 rotates, the rotor of the generator 32, which is one body with the wind turbine 20, also rotates, causing a magnetic field between the stator and rotor to change and generating electrical power through the principle of electromagnetic induction. The generated electric power is supplied to a battery (unrepresented).

With the wind power generating device 30 of this preferred embodiment as discussed above, the blade 10 is provided with a primary wind receptor 15 and a secondary wind receptor 16, and thus can receive wind in the reverse flow direction and receive drag. Through this, obtaining good startability in the low wind speed range is possible.

The blade 10 is provided with the secondary wind receptor 16 behind the front edge 13, allowing greatly increased wind-receiving surface area with respect to wind in the reverse flow direction without increasing the projection surface area. Through this, reduction in the air resistance acting on the blade 10 is possible.

The secondary wind receptor 16 is formed in a sawtooth shape tilted toward the back edge 14 side, so wind in the reverse flow direction is certainly received and it is possible to receive a greater drag.

The height and width of the peaks 16a of the secondary wind receptor 16 become smaller toward the back edge 14 side, so wind can strike all of the peaks 16a.

The front edge 13 is formed in a streamlined shape, so reduction in turbulence generation surrounding the front edge 13 and reduction in air resistance acting on the blade 10 are both possible.

When the blade 10 moves forward, the lift force FL acts on the blade 10, so increased energy conversion efficiency for the medium wind speed range and increased propulsion force acting on the blade 10 are both possible. Through this, increased rotational speed of the wind turbine 20 for the medium wind speed range is possible. However, the magnitude of the lift force FL is small compared to the magnitude of the drag, so the rotational speed of the wind turbine 20 does not become excessively great. Specifically, the circumferential speed ratio (=speed of blade 10/wind speed) converges to 1.

Because the back edge 14 is bent backward toward the second blade surface 12, turbulence is generated at the surface on the second blade surface 12 side in the back edge 14 when air flows in the regular flow direction. The generated turbulence becomes resistance acting on the blade 10 in the regular flow direction. In addition, the magnitude of the turbulence becomes greater the faster the blade's 10 moving speed. The generated turbulence generates a resistance force in the regular flow direction and negates part of the drag in the reverse flow direction. Through this, preventing the rotational speed of the wind turbine 20 from becoming excessively great for the high wind speed range is possible.

Second Preferred Embodiment

Figure 7:
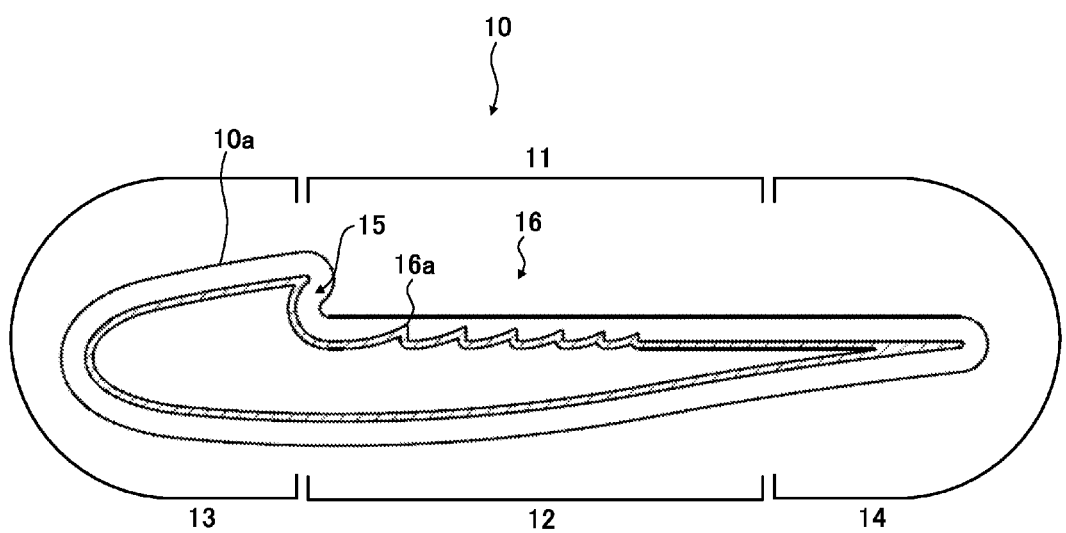
FIG. 7 is a cross-sectional view of a blade according to a second preferred embodiment of the present invention.

Next, the wind power generating device 30 according to a second preferred embodiment of the present invention is explained with reference to FIG. 7. In the wind power generating device 30 of this preferred embodiment, the shape of the blade 10 differs from that of the above-described first preferred embodiment. Compositions that are the same as or equivalent to those of the first preferred embodiment use the same reference numbers, and explanation of such is omitted or abbreviated. The same is also true for the below-described second through seventh preferred embodiments.

The back edge 14 of the blade 10 of the above-described first preferred embodiment is curved toward the second blade surface side 12, but the back edge 14 of the blade 10 of this preferred embodiment is such that surface of the first blade surface 11 side extends on an extension of the line of the first blade surface 11.

Compositions other than this, for example the first blade surface 11, the second blade surface 12, the front edge 13, the primary wind receptor 15 and the secondary wind receptor 16, are the same as in the blade 10 according to the above-described first preferred embodiment.

With the wind power generating device 30 of this second preferred embodiment, turbulence does not occur around the back edge 14 of the blade 10, so it is possible to further increase the rotational speed of the wind turbine 20 in the medium wind speed region compared to the wind power generating device 30 of the first preferred embodiment.

Third Preferred Embodiment

Figure 8:
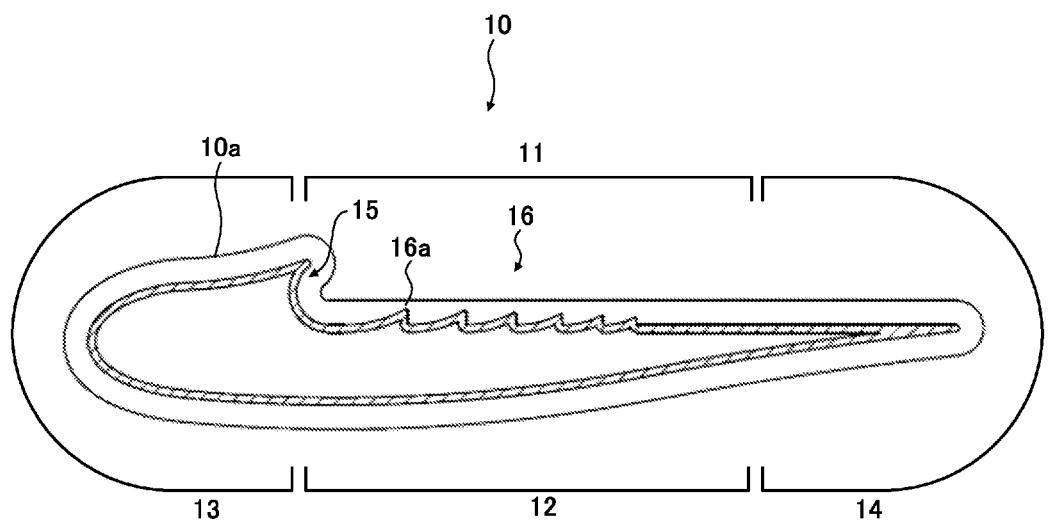
FIG. 8 is a cross-sectional view of a blade according to a third preferred embodiment of the present invention.

Next, the wind power generating device 30 according to a third preferred embodiment of the present invention is explained with reference to FIG. 8. In the wind power generating device 30 of this preferred embodiment, the shape of the blade 10 differs from that of the above-described first preferred embodiment.

The front edge 13 of the blade 10 of the above-described first preferred embodiment is formed with a convex curved surface facing the outside of the blade 10, but the front edge 13 of the blade 10 of this preferred embodiment is such that the back end of the first blade surface 11 side is formed with a concave curved surface facing the inside of the blade 10, and parts other than this are formed of convex curved surfaces facing the outside of the blade 10.

In addition, the back edge 14 of the blade of the above-described first preferred embodiment is bent toward the second blade surface 12 side, but in the back edge 14 of the blade 10 of this preferred embodiment, the surface on the first blade surface 11 side extends on an extension of the line of the first blade surface 11.

The other compositions, for example the first blade surface 11, the second blade surface 12, the primary wind receptor 15 and the secondary wind receptor 16, are the same as in the blade 10 according to the above-described first preferred embodiment.

With the wind power generating device 30 of this third preferred embodiment, turbulence occurs around the concave part of the front edge 13 when the wind turbine rotates, so it is possible to prevent the rotational speed of the wind turbine 20 from becoming excessively great in the high wind speed range, the same as in the wind power generating device 30 of the first preferred embodiment.

Fourth Preferred Embodiment

Figure 9:
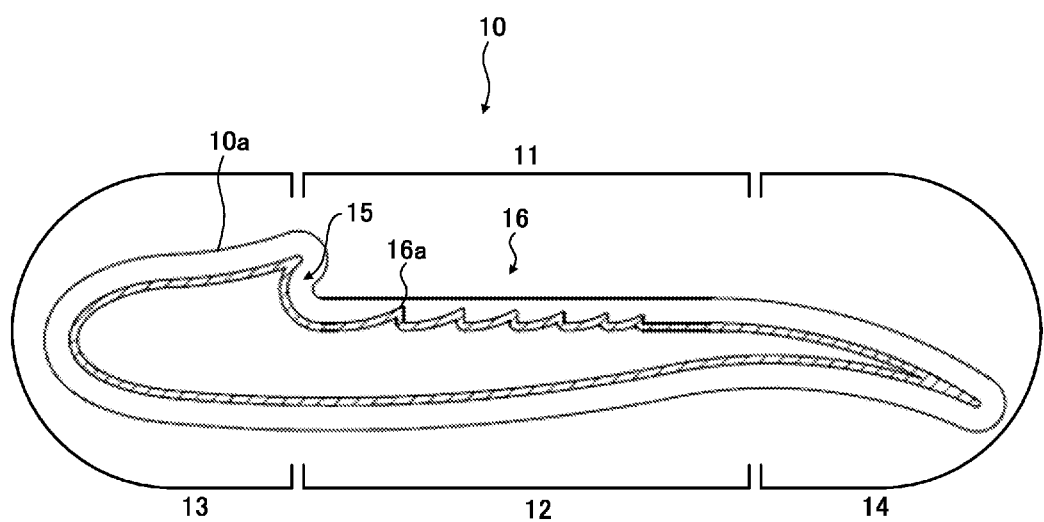
FIG. 9 is a cross-sectional view of a blade according to a fourth preferred embodiment of the present invention.
Figure 10:
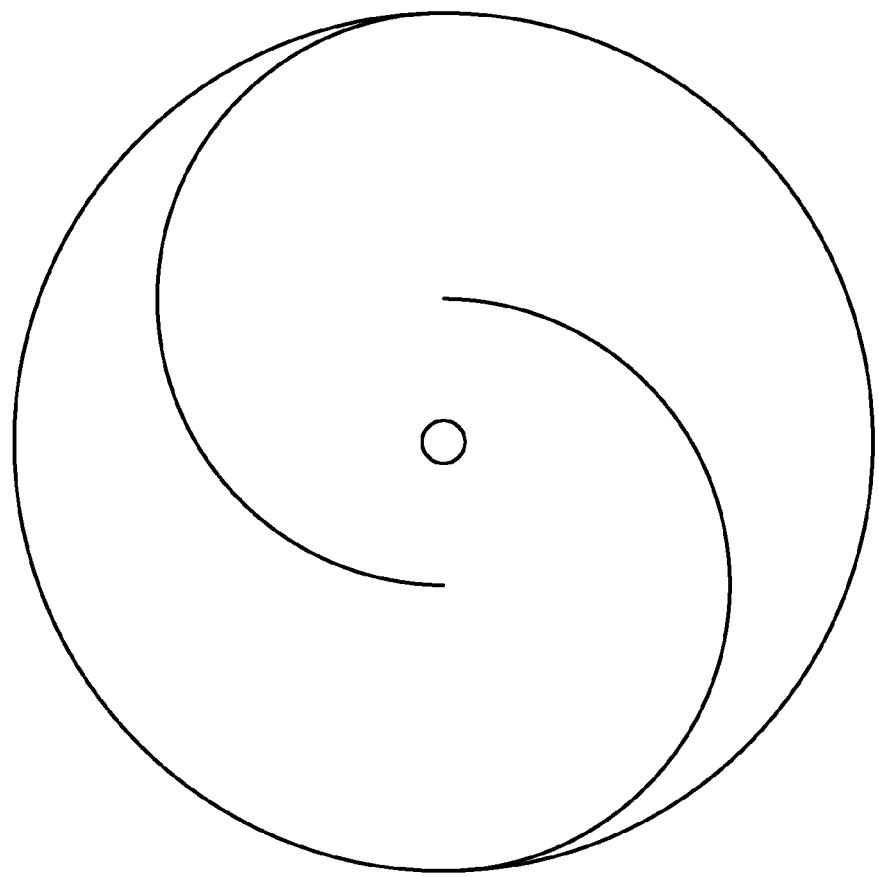
FIG. 10 is a planar view schematically showing a Savonius-type wind turbine.

Next, the wind power generating device 30 according to a fourth preferred embodiment of the present invention will be described with reference to FIG. 9. In the wind power generating device 30 of this preferred embodiment, the shape of the blade 10 differs from that of the above-described first preferred embodiment.

The front edge 13 of the blade 10 in the above-described first preferred embodiment is formed with a convex curved surface facing the outside of the blade 10, but the front edge 13 of the blade 10 in this preferred embodiment is such that the back end of the first blade surface 11 side is formed with a concave curved surface facing the inside of the blade 10, and parts other than this are formed with a convex curved surface facing the outside of the blade 10.

Compositions other than this, for example the first blade surface 11, the second blade surface 12, the back edge 14, the primary wind receptor 15 and the secondary wind receptor 16, are the same as in the blade 10 according to the above-described first preferred embodiment.

With the wind power generating device 30 of this fourth preferred embodiment, when the wind turbine 20 rotates no turbulence is generated not only around the back edge of the blade 10 but also around the concave part of the front edge 13, so it is possible to more certainly prevent the rotational speed of the wind turbine 20 from becoming excessively great for the high wind speed range, compared to the wind power generating device 30 of the first preferred embodiment.

Figure 11:
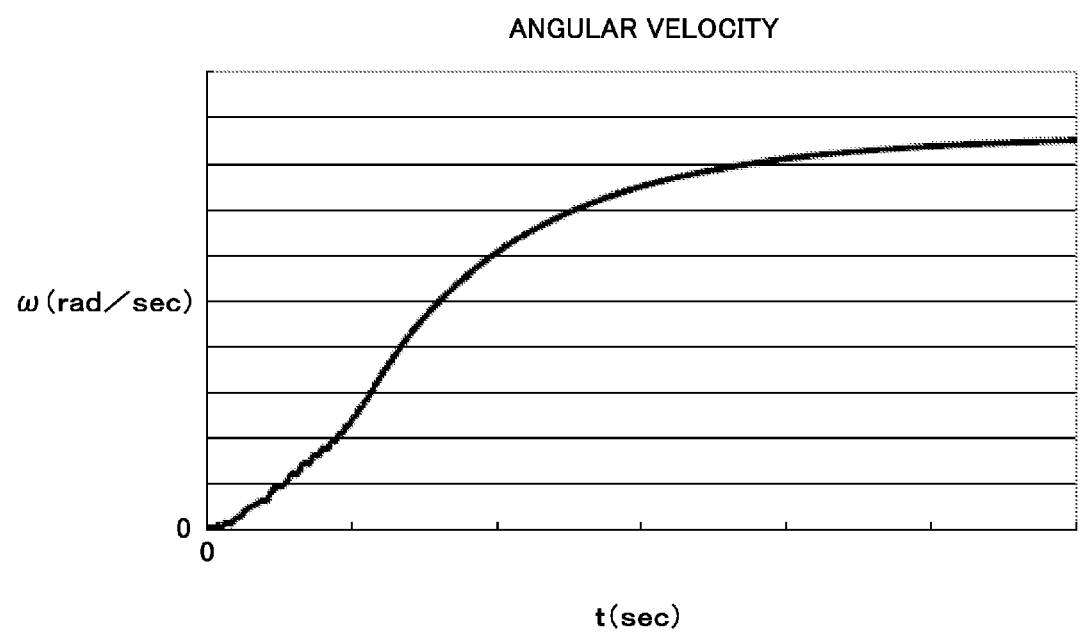
FIG. 11 is a graph showing change over time in angular velocity of a wind power generating device according to the first preferred embodiment of the present invention.
Figure 12:
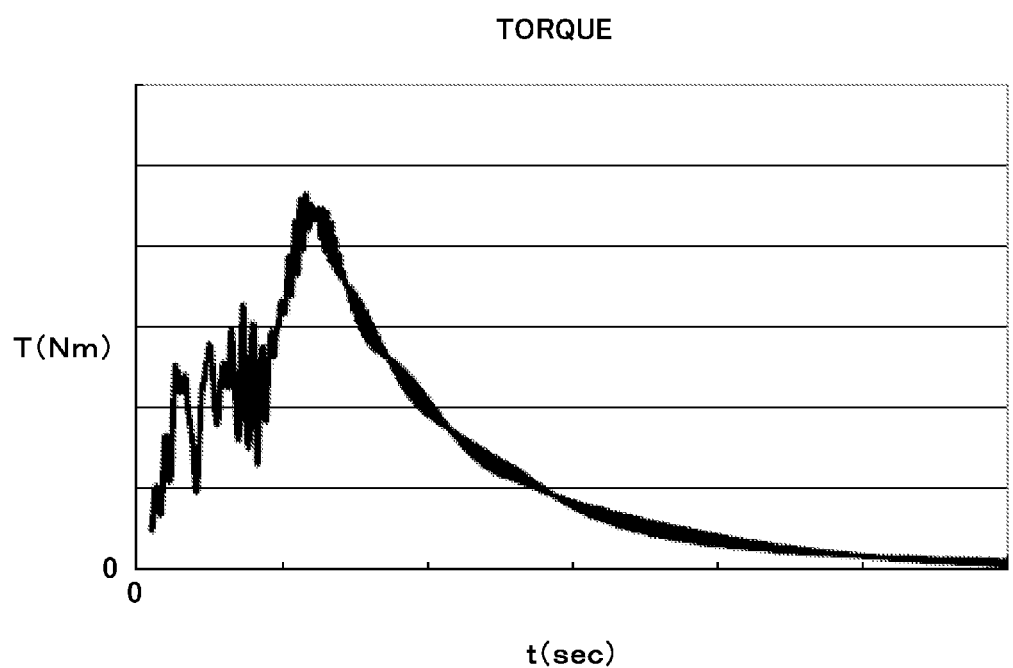
FIG. 12 is a drawing showing the relationship between time and torque in a wind power generating device according to the first preferred embodiment of the present invention.
Figure 13:
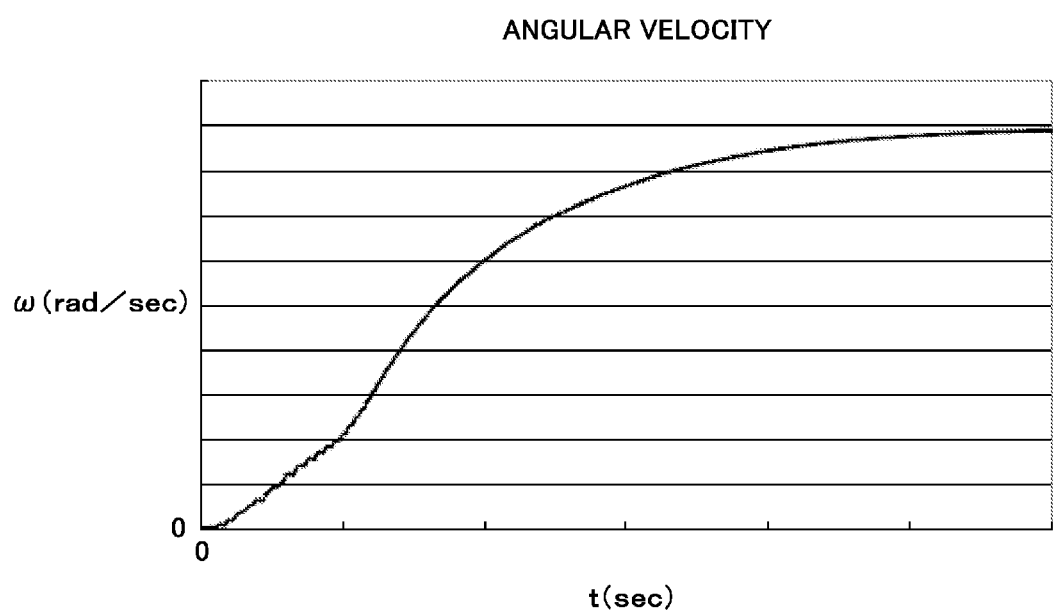
FIG. 13 is a drawing showing the relationship between time and angular velocity in a wind power generating device according to the second preferred embodiment of the present invention.
Figure 14:
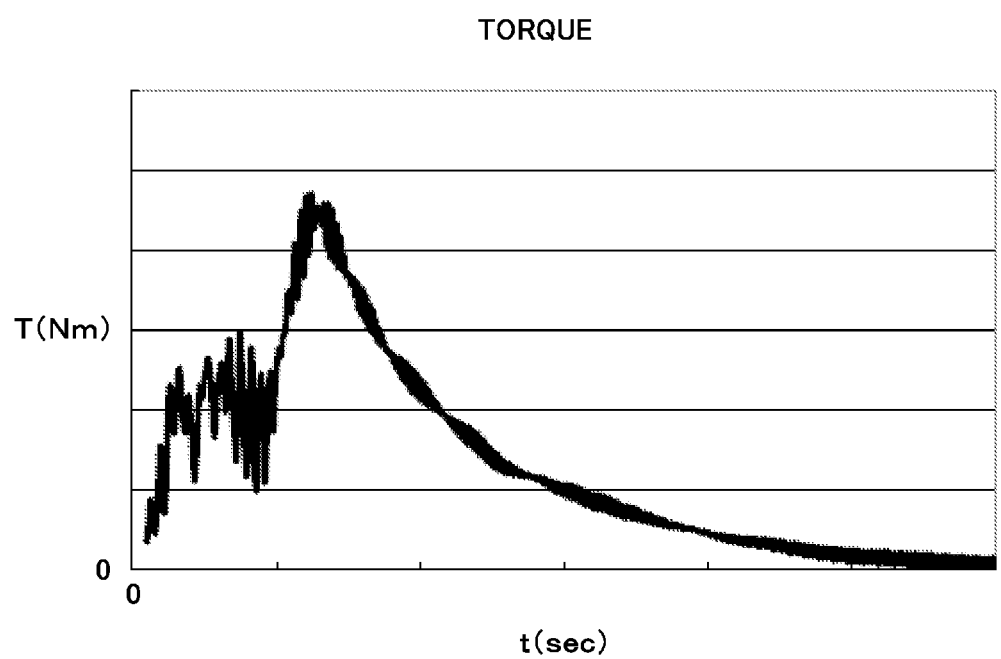
FIG. 14 is a drawing showing the relationship between time and torque in a wind power generating device according to the second preferred embodiment of the present invention.
Figure 15:
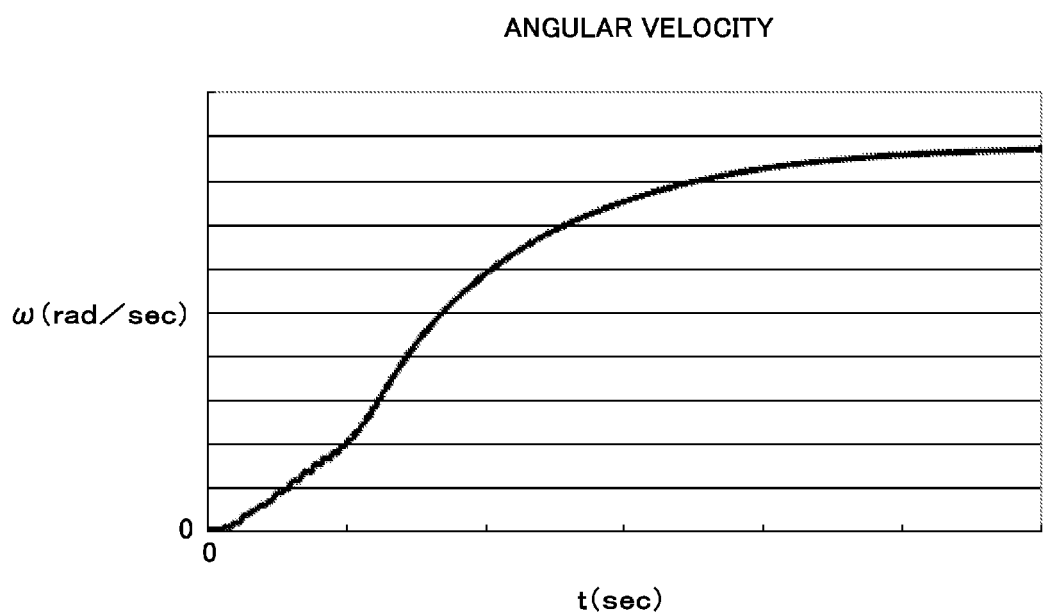
FIG. 15 is a drawing showing the relationship between time and angular velocity in a wind power generating device according to the third preferred embodiment of the present invention.
Figure 16:
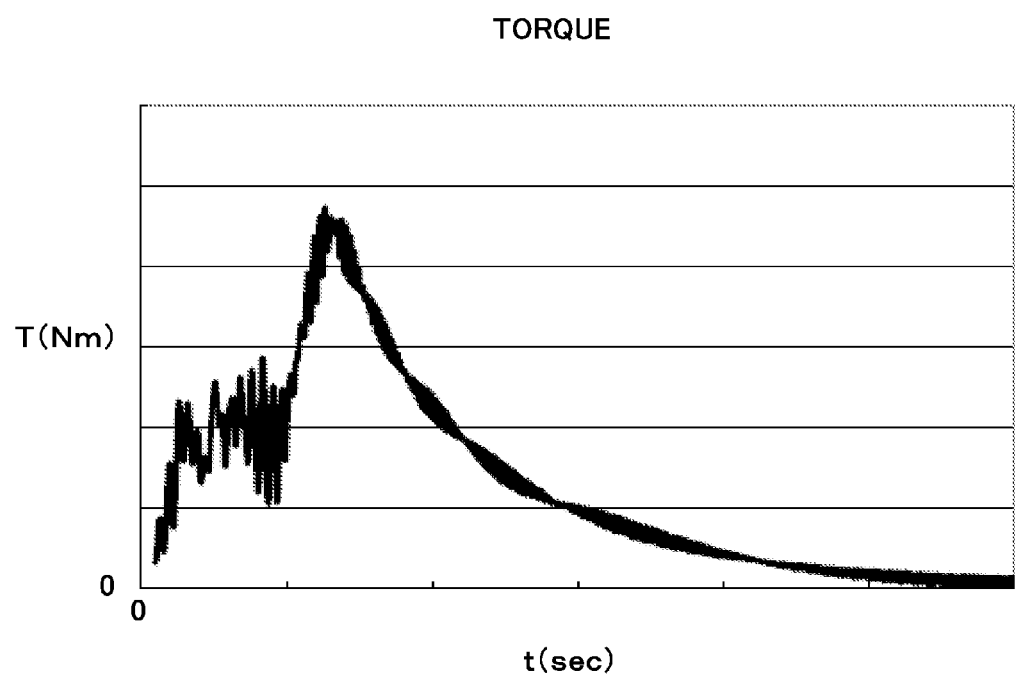
FIG. 16 is a drawing showing the relationship between time and torque in a wind power generating device according to the third preferred embodiment of the present invention.
Figure 17:
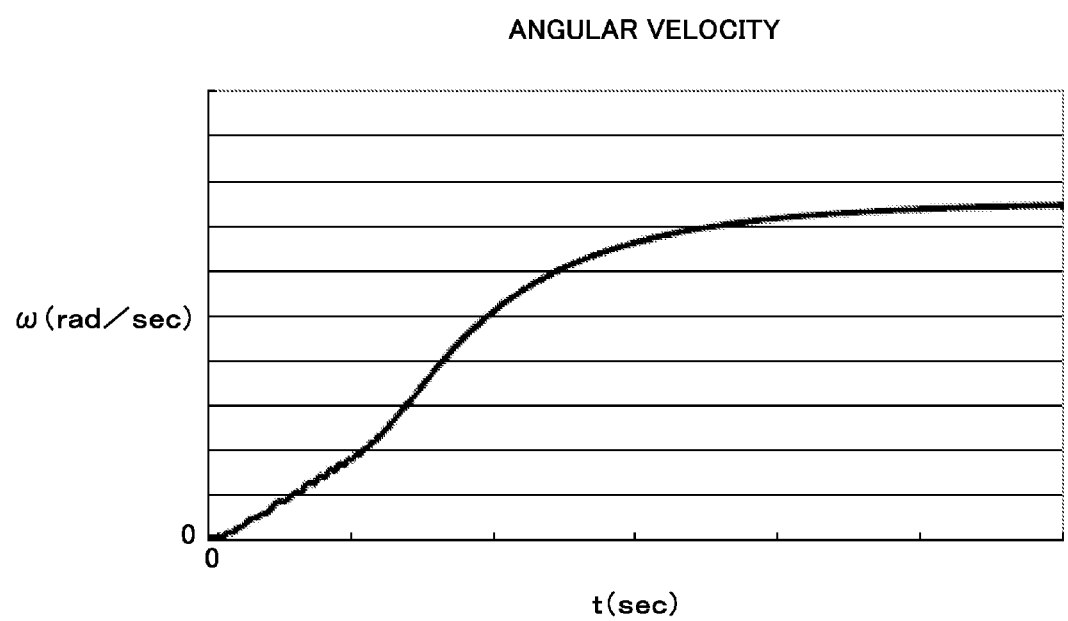
FIG. 17 is a drawing showing the relationship between time and angular velocity in a wind power generating device according to the fourth preferred embodiment of the present invention.
Figure 18:
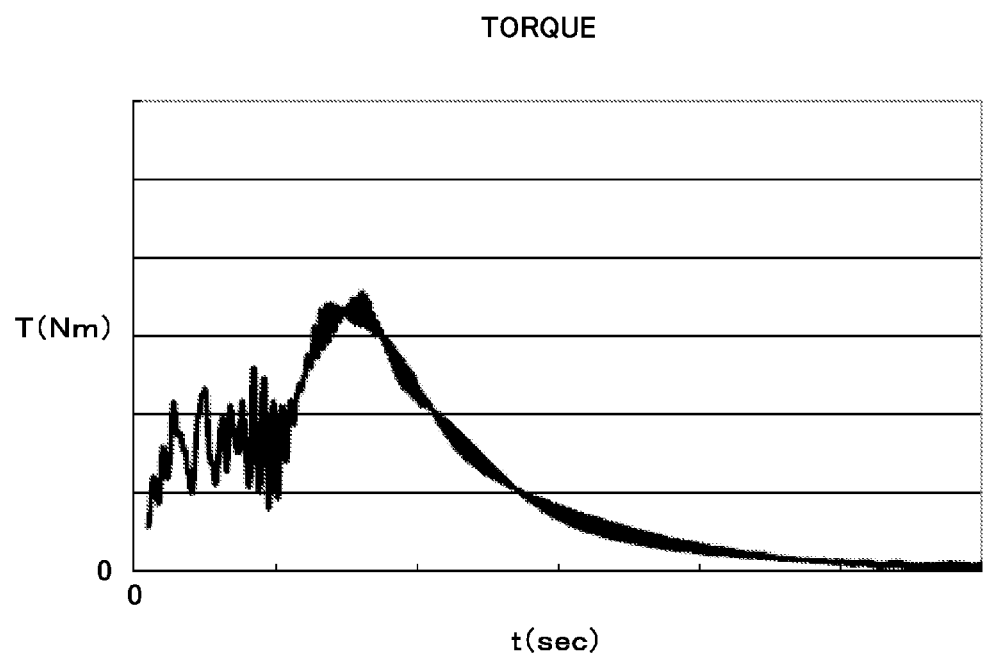
FIG. 18 is a drawing showing the relationship between time and torque in a wind power generating device according to the fourth preferred embodiment of the present invention.
Figure 19:
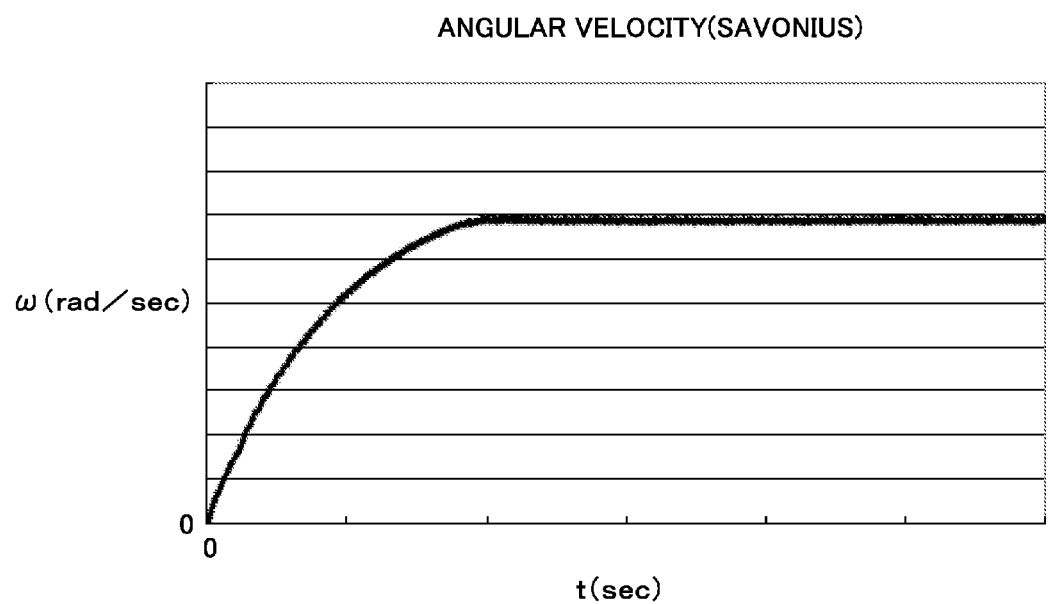
FIG. 19 is a drawing showing the relationship between time and angular velocity in a Savonius-type wind turbine.
Figure 20:
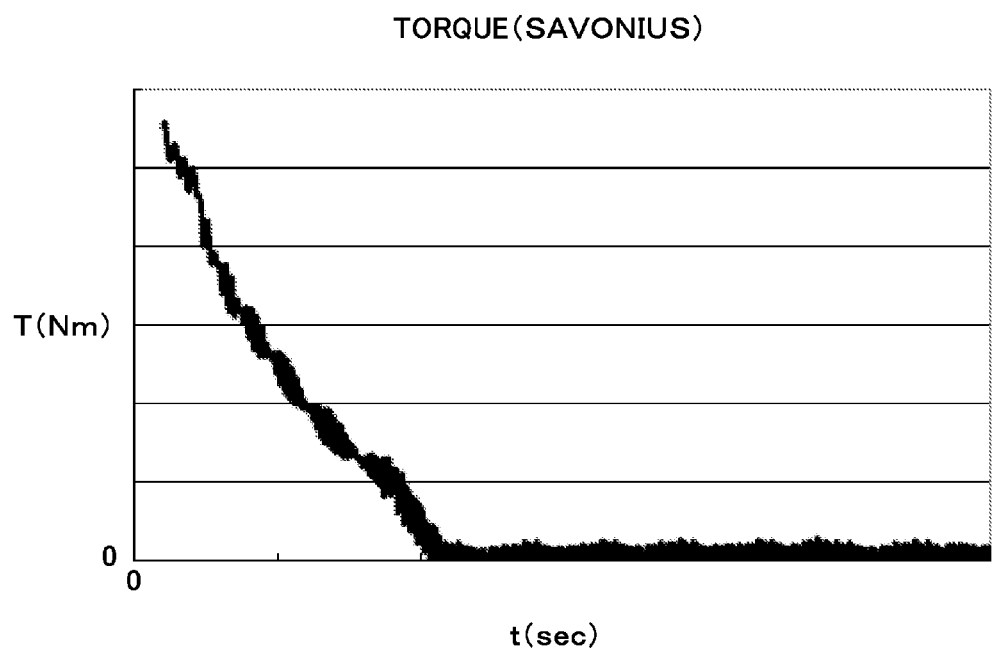
FIG. 20 is a drawing showing the relationship between time and torque in a Savonius-type wind turbine.

Next, the properties of the wind turbines 20 according to the first through fourth preferred embodiments are compared to each other and compared to the properties of a Savonius-type wind turbine shown in FIG. 13, with reference to FIGS. 11 to 20. FIGS. 11, 13, 15, 17 and 19 are graphs showing the change in angular velocity ω (rad/sec) with the passing of time t (sec) when a prescribed wind in the medium wind speed range is directed at and causes movement in the wind turbines 20 according to the first through fourth preferred embodiments and a Savonius-type wind turbine, respectively, all from a stopped state. FIGS. 12, 14, 16, 18 and 20 are graphs showing the change in torque T (Nm) acting on the rotating shaft 21 in those cases.

In FIGS. 11-20, the horizontal axis displays time t. In FIGS. 11, 13, 15, 17 and 19, the vertical axis displays the angular velocity ω, and in FIGS. 12, 14, 16 and 18, the vertical axis displays the torque T. Each graph is scaled to allow mutual comparison. The graphs in FIGS. 11 to 20 display measurement results when the wind turbine 20 is not connected to the generator 32.

As shown in the graphs of the wind turbine 20 according to the first preferred embodiment in FIGS. 11 and 12, when the curve of the angular velocity ω is in the downward convex range, the torque T increases, and when the curve of the angular velocity ω is in the upward convex range, the torque T decreases. Furthermore, when the angular velocity ω becomes constant, the torque T becomes 0.

The above description is the same in the graphs of the wind turbines 20 according to the second through fourth preferred embodiments and the Savonius-type wind turbine shown in FIGS. 13 to 20.

When FIGS. 11, 13, 15, 17 and 19 are mutually compared and the wind turbines 20 according to the first through fourth preferred embodiments and the Savonius-type wind turbine are placed in descending order of the value to which the angular velocity ω converges (the maximum value), the order becomes the second preferred embodiment, the third preferred embodiment, the first preferred embodiment, the fourth preferred embodiment and the Savonius-type. That is to say, among the wind turbines 20 of the first through fourth preferred embodiments, the rotational speed of the wind turbine 20 according to the second preferred embodiment (having no concavity in the front edge 13 and no bend in the back edge 14) is the greatest.

Thus, the wind turbines 20 according to the first through fourth preferred embodiments have higher rotational speeds than the Savonius-type wind turbine. That is to say, the wind turbines 20 according to the first through fourth preferred embodiments have a higher efficiency than the Savonius-type wind turbine in converting energy received from the wind into rotational energy in the medium wind speed range.

In addition, when the wind turbines 20 according to the first through fourth preferred embodiments are put in descending order of degree of increase in angular velocity (decreasing order of quickness in reaching peak torque T), the order becomes the first preferred embodiment, the second preferred embodiment, the third preferred embodiment and the fourth preferred embodiment. That is to say, among the wind turbines 20 according to the first through fourth preferred embodiments, the wind turbine 20 according to the first preferred embodiment (having no concavity in the front edge 13 and having a bend in the back edge 14) is quickest to start up.

The wind power generating device 30 of the present invention is not limited to the preferred embodiments explained. For example, the blade 10 may be composed as shown in first through third variations shown in FIGS. 21-23.

First Variation

Figure 21:
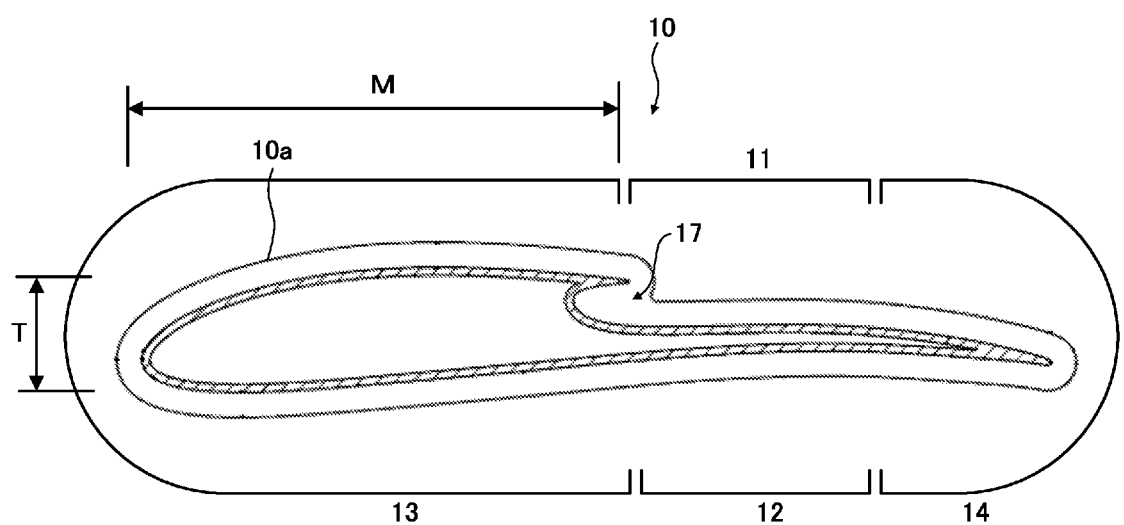
FIG. 21 is a cross-sectional view of a blade according to a first variation of the present invention.

FIG. 21 shows a blade 10 according to a first variation. Unlike the above-described first through fourth preferred embodiments, the blade 10 is not provided with ridges 16a. The first blade surface 11 is formed flat.

The first blade surface 11 and the second glade surface 12 extend virtually parallel, and the first blade surface 11 side describes an extremely gentle convex arc. In addition, the distance of the first blade surface 11 and the second blade surface 12 is shorter than the distance in the above-described first through fourth preferred embodiments.

The blade 10 of the first variation has a unique characteristic in the front edge 13.

The front edge 13 is formed of a convex curved surface facing the outside of the blade 10, the curvature of the front end is widest and the length M in the front-back direction is larger than the thickness T.

The front edge 13 has a streamlined shape, with the thickness T gradually increasing from the front end toward the body and gradually narrowing from the body toward the back end. In addition, the length M of the front edge 13 in the front-back direction is around four times the thickness T of the front edge 13, and is one-half the length L of the blade 10 in the front-back direction. The blade 10 of the first variation is such that the ratio of the size of the front edge 13 as a percentage of the entire blade is large compared to the blades of the above-described first through fourth preferred embodiments.

The back edge 14 has a cross-sectional shape formed in a sharp V-shape, bending with a constant curvature toward the second blade surface 12 side, but the amount of bending is small compared to the back edge 14 of the blade in the above-described first preferred embodiment.

Between the front edge 13 and the first blade surface 11, a curved surface is provided that faces the back edge 14 side and curves parabolically toward the front edge 13 side, and this curved surface functions as a wind receptor 17 for receiving drag from the wind. This wind receptor 17 is provided along the entire lengthwise direction of the blade 10. The height of this wind receptor 17 is around twice the distance between the first blade surface 11 and the second blade surface 12. The concavity of the wind receptor 17 is deep compared to the concavity of the primary wind receptor 15 in the first through fourth preferred embodiments.

The blade 10 of the first variation is such that difference between the path of air flowing along the first blade surface 11 and the path of air flowing along the second blade surface 12 is larger than that of the blade 10 according to the above-described first through fourth preferred embodiments, so the lift FL acting on the blade 10 when the wind turbine 20 is rotating is large. In addition, the wind-receiving surface area is small and the resistance is small compared to the first through fourth preferred embodiments. Accordingly, the wind turbine 20 of the first variation has the characteristics of a lift-type blade, namely greater rotational speed and less torque than the wind turbines 20 according to the first through fourth preferred embodiments.

Second Variation

Figure 22:
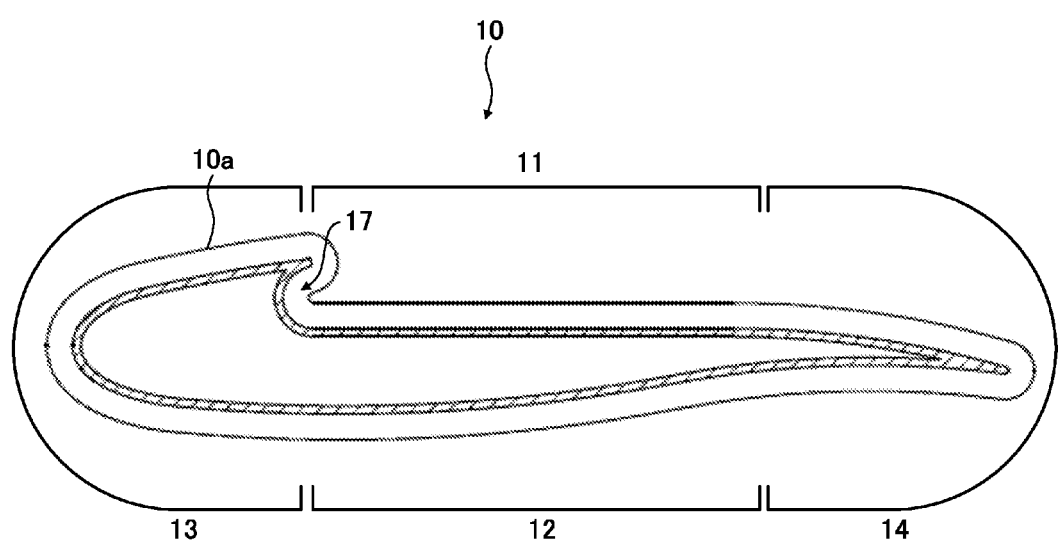
FIG. 22 is a cross-sectional view of a blade according to a second variation of the present invention.

FIG. 22 shows the blade 10 according to a second variation. The blade 10 is not provided with the peaks 16a, the same as the above-described first variation. The first blade surface 11 is formed flat.

The composition of the second blade surface 12, the front edge 13 and the back edge 14 is the same as in the blade 10 of the above-described first preferred embodiment. In addition, the composition of the wind receptor 17 is the same as the primary wind receptor 15 of the blade according to the first preferred embodiment.

The blade 10 of the second variation has virtually the same cross-sectional shape as the blade 10 of the first preferred embodiment with the exception of the first blade surface 11.

Third Variation

Figure 23:
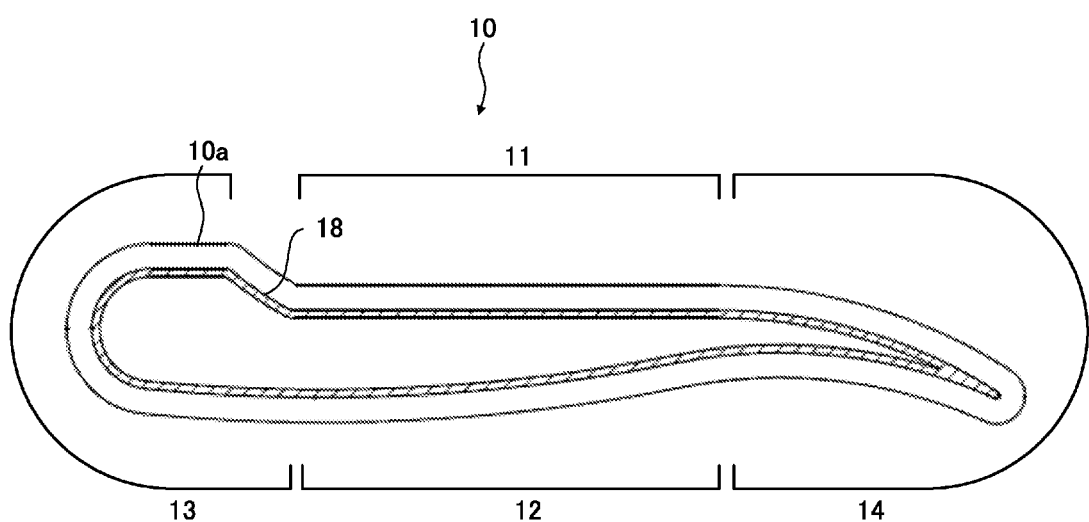
FIG. 23 is a cross-sectional view of a blade according to a third variation of the present invention.

FIG. 23 shows the blade 10 according to a third variation. The blade 10 is not provided with the peaks 16a, the same as the above-described first variation.

The front edge 13 is formed with a cross-sectional shape that is semicircular, with two straight lines extending toward the back from both ends of that semicircle.

The first blade surface 11 is formed flat, and the second blade surface 12 is formed with a gentle convex curved surface facing the outside of the blade 10.

The blade 10 of the third variation has the characteristics of a wind receptor 18.

Between the front edge 13 and the first blade surface 11, an inclined surface having an angle of inclination of around 45 degrees and facing the right in FIG. 12 is formed, and this inclined surface functions as the wind receptor 18.

The back edge 14 is formed in a sharp V-shape and bends with a fixed curvature toward the second blade surface 12 side.

In the above-described first through fourth preferred embodiments and first through third variations, the blade 10 extends linearly in the lengthwise direction, but for example the blade 10 may curve in the lengthwise direction or may be bent.

With the first through fourth preferred embodiments and first through third variations, the material composing the blade 10 is aluminum, but this may be any lightweight, strong material, and other suitable materials, for example carbon fibers or resin, are fine, and this need not be a single material. In addition, in the preferred embodiments, the inside of the blade 10 is hollow, but this need not be hollow.

With the first through fourth preferred embodiments and first through third variations, the number of blades 10 provided in the wind turbine 20 need not be limited to 3, but may be 2 or 4. In such cases, the properties of the wind turbine 20 change in accordance with the number of blades 10.

INDUSTRIAL APPLICATION

The present invention is extremely effective because good startability in the low wind speed range and high energy conversion efficiency in the medium wind speed range can be obtained, and it is also possible to prevent velocity from becoming excessively great in the high wind speed range.

What is claimed is:

1. A blade that receives drag from wind and rotates around a rotating shaft, to advance in a forward direction, this blade comprising:
   a first blade surface;
   a second blade surface forming a back surface of the first blade surface;
   a step protruding from a front end of the first blade surface in a direction going away from the second blade surface, and with a back surface formed in the shape of a curved surface concave toward the front side of the forward direction;
   a front edge connected to a front end of the step and a front end of the second blade surface and formed in a curved surface shape convex toward the forward direction; and
   a back edge connected to a back end of the first blade surface and a back end of the second blade surface and forming an acute angle facing a back side of the forward direction;
   wherein multiple peaks protruding in the direction away from the second blade surface are formed on the first blade surface as acute-angled sawtooth-shaped ridges facing the back edge side, and
   wherein, when being viewed from a direction along the rotating shaft, the ridge of each of multiple peaks is formed so as to be lower than a straight line touching the back edge and passing through the connection between the front edge and the step.

2. The blade of claim 1, wherein the curved surface concave toward the second blade surface is formed in the step.

3. The blade of claim 1, wherein the back edge is bent toward the second blade surface side.

4. A wind turbine in which the blade of claim 1 is provided so that the first blade surface faces the outside.

5. A wind power generating device provided with the wind turbine of claim 4.

* * * * *